US011138586B1

(12) United States Patent
Phan et al.

(10) Patent No.: US 11,138,586 B1
(45) Date of Patent: Oct. 5, 2021

(54) DIGITAL ASSET EXCHANGE SYSTEM AND RELATED METHODS

(71) Applicant: DAXCHAIN LIMITED, Sheung Wan (HK)

(72) Inventors: Maggie Phan, Shatin (HK); Anthony Phan, Shatin (HK)

(73) Assignee: DAXCHAIN LIMITED, Sheung Wan (CN)

( * ) Notice: Subject to any disclaimer, the term of this patent is extended or adjusted under 35 U.S.C. 154(b) by 0 days.

(21) Appl. No.: 16/827,619

(22) Filed: Mar. 23, 2020

(51) Int. Cl.
  G06Q 20/32  (2012.01)
  G06Q 20/34  (2012.01)
  G06Q 20/38  (2012.01)
  G06Q 20/10  (2012.01)
  G06Q 20/40  (2012.01)

(52) U.S. Cl.
  CPC ........ *G06Q 20/3223* (2013.01); *G06Q 20/10* (2013.01); *G06Q 20/3433* (2013.01); *G06Q 20/38215* (2013.01); *G06Q 20/401* (2013.01); *G06Q 20/409* (2013.01)

(58) Field of Classification Search
  CPC ............. G06Q 20/3232; G06Q 20/10; G06Q 20/3433; G06Q 20/38125; G06Q 20/401; G06Q 20/409
  USPC ..................................................... 705/3–44
  See application file for complete search history.

(56) References Cited

U.S. PATENT DOCUMENTS 9,747,586 B1 * 8/2017 Frolov ............... G06Q 20/3678
9,892,460 B1 * 2/2018 Winklevoss ........... G06Q 40/04
10,394,845 B2 * 8/2019 Madisetti ........... G06Q 20/3829
10,825,090 B2 * 11/2020 Saigh ..................... G06Q 40/04
2015/0332256 A1 * 11/2015 Minor .................. G06Q 20/381 705/69
2017/0011460 A1 * 1/2017 Molinari ............... G06F 21/645

(Continued)

FOREIGN PATENT DOCUMENTS

CN  101169054 A  4/2008
CN  103473677 A  12/2013
CN  105678546 A  6/2016

(Continued)

OTHER PUBLICATIONS

"E-Payments: Use Blockchain Technology to Rout Risk Out of Network Transactions", ProQuest Document Id: 1873448542, Electronics for You, New Delhi, Mar. 1, 2017.*

(Continued)

*Primary Examiner* — Frantzy Poinvil
(74) *Attorney, Agent, or Firm* — Birch, Stewart, Kolasch & Birch, LLP

(57) ABSTRACT

The present invention provides a system as a computer server platform and application programming software installed in primary devices of users for exchanging and trading digital asset securely and anonymously between two users of the system where said digital asset is registered under a device account of a primary device of a user with the system using a unique device account name. The present invention respects "privacy by design" in GDPR by using device account based-on anonymized data instead of personal account based-on personal data of prior art to ensure the system does not collect, store and process users' personal data in the course of device accounts' set-up and transactions of digital assets.

16 Claims, 13 Drawing Sheets

(56) References Cited

U.S. PATENT DOCUMENTS

2017/0236104 A1* 8/2017 Biton .................. H04L 9/30
                                                    705/64
2018/0268483 A1* 9/2018 Jayaram ............ G06F 16/258

FOREIGN PATENT DOCUMENTS

| CN | 105913253 A | 8/2016 |
|----|-------------|--------|
| CN | 108090764 A | 5/2018 |

OTHER PUBLICATIONS

"MasterCard could allow Bitcoin Transactions on credit cards", ProQuest Document Id: 2071401006, Telegraph.co.uk, London Jul. 18, 2018.*

Chinese Search Report for Hong Kong Short Term Patent Application No. 2000362, dated Sep. 11, 2020, With English translation.

* cited by examiner

One embodiment of HUDA stored in the central ledger of DAX Platform

| Hash unique device account HUDA[1] | Timestamp of DAX App registration | Arbitrary device account name[2] (for user's personal use only) | User Password / Pattern code for redemption/ validation | User answers to multiple choices security questions | Device status[3] | GPS location at the time of registration | Primary/emergency devices[4] | Actual GPS location tracked by DAX App[5] | In-use status[6] |
|---|---|---|---|---|---|---|---|---|---|
| HUDA HK3786 | 01/01/2019 13:20:26 | Maxi | 67903xct / Pattern drawing 15369 | 1/4/3/2/1 | Active | GPX HK1234 | Primary device Emergency device of HUDA HK0139 | GPX HK2468 | |
| HUDA HK0238 | 08/02/2019 17:25:18 | Mini | 3578dh78 / Pattern drawing 148568 | 3/4/3/1/5 | Active | GPX HK1359 | Primary device Emergency device of HUDA HK3576 | GPX HK2325 | |
| HUDA HK 3576 | 23/03/2019 09:35:42 | Golden | Dh568xt / Pattern drawing 1582369 | 1/1/3/2/3 | DAX App locked | GPX HK4568 | Primary device Emergency device of HUDA HK3786 | GPX HK6753 | Lost device |
| HUDA HK0139 | 12/04/2019 21:06:03 | Ruby | 566dghr / Pattern drawing 257895 | 3/1/4/3/6 | Active | GPX HK3689 | Primary device Emergency device of HUDA HK0238 | GPX HK1369 | |

[1] HUDA is a hashed unique device identifier registered in DAX App as well as in DAX Platform for identify a device, preferably a mobile device. HUDA is invisible and unknown to a user.
[2] Since HUDA is invisible to the authorizer user, said user could assign an arbitrary account name for identification of HUDA, but this arbitrary account name is not used by DAX Services for all Digital Asset transactions.
[3] Device status can be "locked" or "active". In locked status, DAX App cannot be used. The pre-registered emergency device can be used to lock or unlock a primary device using a combination of password, pattern code and/or the right answers to security questions authentication method by the authorized user of said primary device.
[4] An authorizer user can only use one primary device for managing and redeem/validate Digital Asset registered under HUDA of said primary device. Said authorizer user could register at least one emergency device to access and redeem/validate Digital Asset registered under HUDA of said primary device in the cases of critical situations such as the loss of the primary device.
[5] Automatic GPS location tracking at the lost device could help the authorizer user who lost his/her device to locate the lost device by the use of an emergency device.
[6] In-use status column shows if any primary device is reported "lost" from the authorized users using emergency devices. HUDA HK3786 was reported "lost" by its authorized user using emergency device of HUDA HK3576 and therefore DAX App in HUDA HK3786 is put in "dormant" status and cannot be used by anyone.

One embodiment of central ledger recording all transactions of each and every Digital Asset under corresponding HUDA

| Order of transferred Digital Asset | Digital Asset registered under HUDA | Vendor | Digital Asset type | Digital Asset expiry date (if any) | Transferor | actual value | Transaction items | Transaction | Balance | Transaction location (GPS Data) | Transaction timestamp (local time) | Transferee and redeem/validate status |
|---|---|---|---|---|---|---|---|---|---|---|---|---|
| MRC 23458 | | | | | | | | | | | | |
| 1 | HUDA HK3786 | A | Gift card | | Vendor A | 50$ | | | | GPX HK1234 | 05/04/2019 09:30:01 | |
| | | | | | HUDA HK3786 | | | | | GPX HK4562 | 12/04/2019 13:36:20 | Transfer to HUDA HK0238. |
| 2 | HUDA HK0238 | | | | HUDA HK3786 | 50$ | | | | GPX HK3421 | 12/04/2019 13:36:21 | |
| | | | | | | | cloths | 50$ -10$ | 40$ | GPX HK7489 | 15/04/2019 12:30:09 | Vendor A counter. Partially redeemed |
| | | | | | | | foods | 40$ -5$ | 35$ | GPX HK3416 | 10/05/2019 10:09:55 | Vendor A counter. Partially redeemed |
| | | | | | HUDA HK0238 | 35$ | | | | GPX HK2365 | 28/10/2019 11:32:09 | Transfer to HUDA HK0139. |
| 3 | HUDA HK0139 | | | | HUDA HK0238 | 35$ | | | | GPX HK4563 | 28/10/2019 11:32:10 | |
| | | | | | | | foods | 35$ -10$ | 25$ | GPX HK4896 | 30/10/2019 13:36:20 | Vendor A counter. Partially Redeemed |
| | | | | | | | sport item | 25$ -25$ | 0 | GPX HK7843 | 10/11/2019 17:20:01 | Vendor A counter. Fully redeemed |
| MRC 45637 | | | | | | | | | | | | |
| 1 | HUDA HK3786 | B | Cinema ticket | 28/04/2019 12:00 | Vendor E | 20$ | | | | GPX HK7489 | 10/04/2019 17:20:01 | |
| | | | | | | | | | | GPX HK7489 | 15/04/2019 17:00:08 | Vendor B counter. Fully validated |

Fig. 7A

| Numbering of Digital Asset transfer | HUDA registration of Digital Asset | Vendor | Digital Asset type | Digital Asset expiry date (if any) | Transferor | actual value | Transaction items | Transaction | Balance | Transaction location (GPS Data) | Transaction timestamp | Transferee and redeem/validate status |
|---|---|---|---|---|---|---|---|---|---|---|---|---|
| MRC 54735 | | | | | | | | | | | | |
| 1 | HUDA HK3786 | E | Club membership card | 31/12/2019 12:00 | Vendor E | 100$ | | | | GPX HK5678 | 08/08/2019 10:02:33 | |
| | | | | | | | | | | GPX HK3567 | 09/10/2019 10:00:00 | Vendor E gate. Partially redeemed/validated |
| MRC 45321 | | | | | | | | | | | | |
| | HUDA HK0238 | F | Concert ticket | 21/6/2019 | Vendor F | 80$ | | | | GPX HK6783 | 10/05/2019 12:55:01 | Not yet redeemed/validated |
| MRC 46842 | | | | | | | | | | | | |
| 1 | HUDA HK0238 | Y | Restaurant coupon | | Vendor Y | 20$ | | | | GPX HK8324 | 22/05/2019 09:33:06 | |
| | | | | | | | | | | GPX HK5700 | 10/06/2019 13:00:08 | Vendor Y counter. Fully redeemed |
| MRC 54934 | | | | | | | | | | | | |
| 1 | HUDA HK0139 | X | Bus ticket | 31/12/2019 12:00 | Vendor X | 20$ | | | | GPX HK8965 | 08/08/2019 10:02:33 | |
| | | | | | | | Bus ride | 20$ | -5$ | 15$ | GPX HK6754 | 09/10/2019 10:00:00 | Vendor X counter. Partially Redeemed |

Fig. 7B (continue)

One embodiment of partial distributed ledgers recording all Digital Asset transactions under each and every HUDA

| Order of Digital Asset | Digital Asset in MRC | Vendor | Digital Asset type | Digital Asset expiry date (if any) | Transferor | actual value | Transaction items | Transaction | Balance | Transaction location (GPS Data) | Transaction timestamp | Transferee and redeem/validate status |
|---|---|---|---|---|---|---|---|---|---|---|---|---|
| HUDA HK3786 (Maxi) | | | | | | | | | | | | |
| 1 | MRC 23458 | A | Gift card | | Vendor A (initial purchase) | 50$ | | | | GPX HK1234 | 05/04/2019 09:30:01 | |
|  |  |  |  |  | HUDA HK3786 |  |  |  |  | GPX HK4562 | 12/04/2019 13:36:20 | Transfer to HUDA HK 0238 |
| 2 | MRC 45637 | B | Cinema ticket | 28/04/2019 12:00 | Vendor E (initial purchase) | 20$ | | | | GPX HK7489 | 10/04/2019 17:20:01 | |
|  |  |  |  |  |  |  |  |  |  |  | 15/04/2019 17:00:08 | Vendor B counter. Fully Validated |
| 3 | MRC 54735 | E | Club membership card | 31/12/2019 12:00 | Vendor E (initial purchase) | 100$ | | | | GPX HK5678 | 08/08/2019 10:02:33 | |
|  |  |  |  |  |  |  |  |  |  | GPX HK3567 | 09/10/2019 10:00:00 | Vendor E gate. Partially redeemed/validated |
|  |  |  |  |  | HUDA HK0238 | 35$ |  |  |  | GPX HK2365 | 28/10/2019 11:32:09 | Transfer to HUDA HK0139 |
| 4 | MRC 45321 | F | Concert ticket | 21/6/2019 | Vendor F (initial purchase) | 80$ | | | | GPX HK6783 | 10/05/2019 12:55:01 | Not yet redeemed/validated |

Fig 8

One embodiment of partial distributed ledgers recording all Digital Asset transactions under each and every HUDA

| Order of Digital Asset | Digital Asset in MRC | Vendor | Digital Asset type | Digital Asset expiry date (if any) | Transferor | actual value | Transaction items | Transaction | Balance | Transaction location (GPS Data) | Transaction timestamp | Transferee and redeem/validate status |
|---|---|---|---|---|---|---|---|---|---|---|---|---|
| HUDA HK3786 (Maxi) | | | | | | | | | | | | |
| 1 | MRC 23458 | A | Gift card | | Vendor A (Initial purchase) | 50$ | | | | GPX HK1234 | 05/04/2019 09:30:01 | |
| | | | | | HUDA HK3786 | | | | | GPX HK4562 | 12/04/2019 13:36:20 | Transfer to HUDA HK 0238 |
| 2 | MRC 45637 | B | Cinema ticket | 28/04/2019 12:00 | Vendor E (Initial purchase) | 20$ | | | | GPX HK7489 | 10/04/2019 17:20:01 | |
| | | | | | | | | | | | 15/04/2019 17:00:08 | Vendor B counter. Fully Validated |
| 3 | MRC 54735 | E | Club membership card | 31/12/2019 12:00 | Vendor E (Initial purchase) | 100$ | | | | GPX HK5678 | 08/08/2019 10:02:33 | |
| | | | | | | | | | | GPX HK3567 | 09/10/2019 10:00:00 | Vendor E gate. Partially redeemed/validated |
| | | | | | HUDA HK0238 | 35$ | | | | GPX HK2365 | 28/10/2019 11:32:09 | Transfer to HUDA HK0139 |
| 4 | MRC 45321 | F | Concert ticket | 21/6/2019 | Vendor F (Initial purchase) | 80$ | | | | GPX HK6783 | 10/05/2019 12:55:01 | Not yet redeemed/validated |

Fig. 8A

HUDA HK0238 (Mini)

| # | MRC | Vendor | Type | Sub-ref | Amount | Category | Amt | Δ | Bal | GPX | Date/Time | Notes |
|---|-----|--------|------|---------|--------|----------|-----|-----|-----|-----|-----------|-------|
| 1 | MRC 23458 | A | Gift card | HUDA HK3786 | 50$ | | | | | | 12/04/2019 13:36:21 | |
| | | | | | | cloths | 50$ | -10$ | 40$ | GPX HK3421 | 15/04/2019 12:30:09 | Vendor A counter. Partially Redeemed |
| | | | | | | foods | 40$ | -5$ | 35$ | GPX HK7489 | 10/05/2019 10:09:55 | Vendor A counter. Partially Redeemed |
| | | | | HUDA HK0238 | | | | | | GPX HK3416 | 28/10/2019 11:32:09 | Transfer to HUDA HK 0139 |
| 2 | MRC 46842 | Y | Restaurant coupon | Vendor Y | 20$ | | | | | GPX HK2365 | 22/05/2019 09:33:06 | |
| | | | | | | | | | | GPX HK8324 | 10/06/2019 13:00:08 | Vendor Y counter. Fully redeemed |

HUDA HK0139 (Ruby)

| # | MRC | Vendor | Type | Sub-ref | Amount | Category | Amt | Δ | Bal | GPX | Date/Time | Notes |
|---|-----|--------|------|---------|--------|----------|-----|-----|-----|-----|-----------|-------|
| 1 | MRC 23458 | A | Gift card | HUDA HK0238 | 35$ | | | | | | 28/10/2019 11:32:10 | |
| | | | | | | foods | 35$ | -10$ | 25$ | GPX HK4563 | 30/10/2019 13:36:20 | Vendor A counter. Partially redeemed |
| | | | | | | sport item | 25$ | -25$ | 0 | GPX HK4896 | 10/11/2019 17:20:01 | Vendor A counter. Fully redeemed |
| 2 | MRC 45934 | X | Bus ticket | Vendor X | 20$ | | | | | GPX HK7843 | 08/08/2019 10:02:33 | |
| | | | | | 31/12/2019 12:00 | Bus ride | 20$ | -5$ | 15$ | GPX HK8965 | 09/10/2019 10:00:00 | Vendor X counter. Partially Redeemed |
| | | | | | | | | | | GPX HK6754 | | |

Fig. 8B (continue)

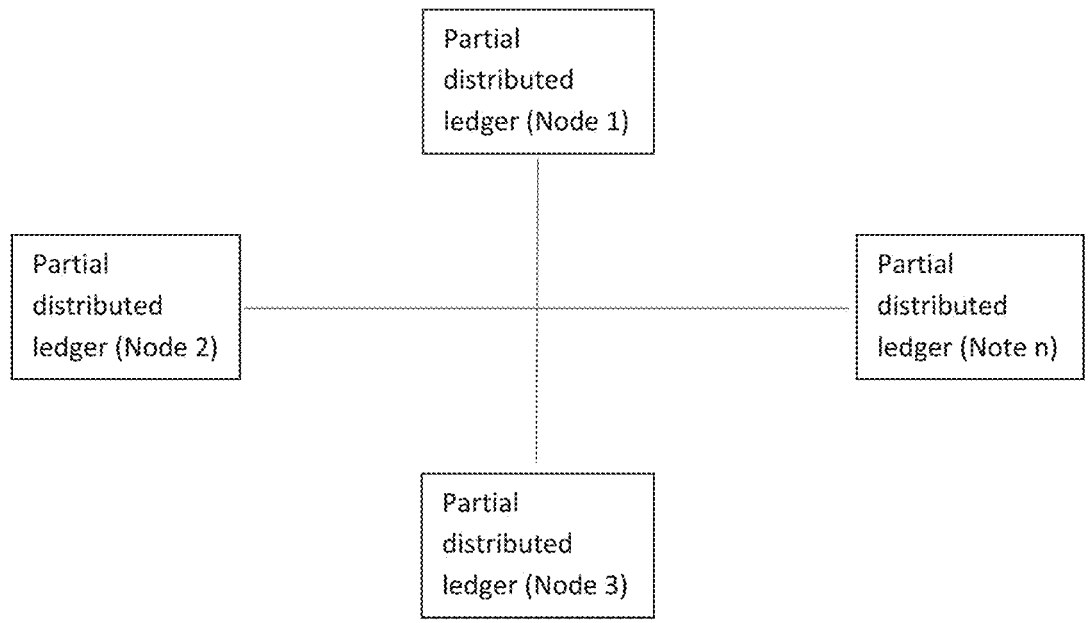
FIG. 11 DAXCHAIN / Partial Distributed Ledger Technology (PDLT)
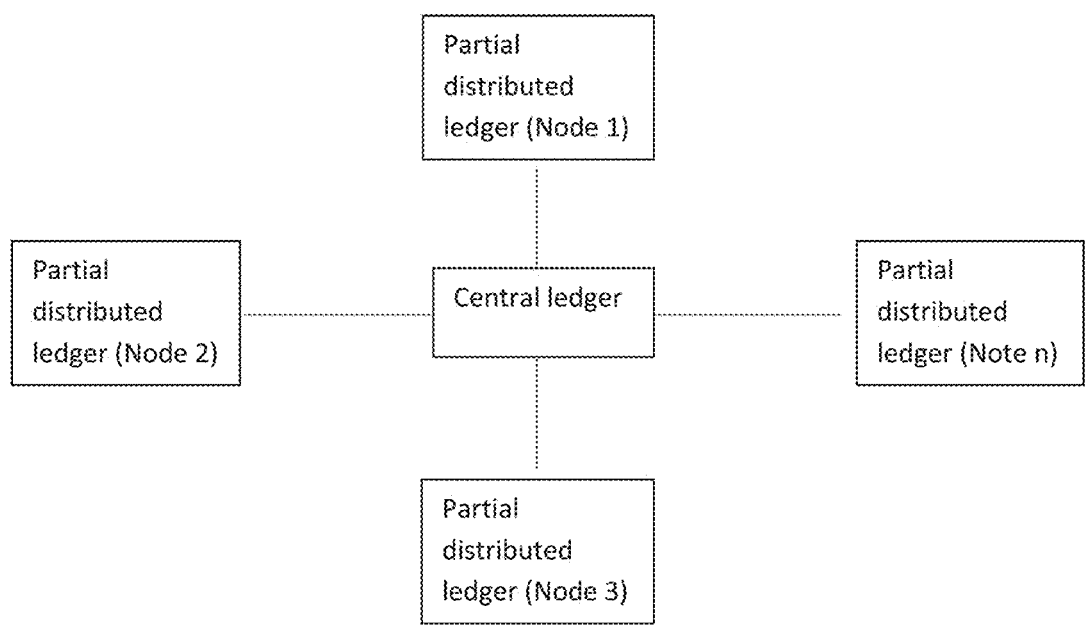
FIG. 12 Combination of central ledger + partial distributed ledgers

DIGITAL ASSET EXCHANGE SYSTEM AND RELATED METHODS

FIELD OF THE INVENTION

The present invention relates to system and related methods with "Privacy by Design" as core concept for securely and anonymously issuing, purchasing, exchanging, trading, redeeming and validating different types of Digital Asset without using users' accounts and personal data of the users involved.

BACKGROUND OF THE INVENTION

In the digital age of the $21^{st}$ century, people are used to accept different online services by downloading and installing application software (App) on their mobile devices which is including but not limited to smartphones, computer tablets and wearables. In order to open an online account such as WhatsApp, Wechat, Google, Facebook or Amazon in the prior art, a user need generally to provide a unique user account name or an online service provider suggests a unique user account name which could be accepted by said user. Some vendors use a cellphone number or an email address as a unique user account name. The next step is to provide a password or pattern code from said user for login into his/her user account. Some online services providers ask for the real name of the user as well as other personal information such as proof of address, personal identity number or even social security number during the process of set up an online account. In order to identify and contact said user for the purpose of authentication and confirmation, an online service provider usually asks for a cellphone number or/and email address of a user in order to send one-time password (OTP) by means of short message service (SMS) to the cellphone or by means of email of said user for inputting said OTP into the cell phone for confirmation of said user with said online service provider.

A personal telephone number or an email address of a user is considered personal data by General Data Protection Regulations (GDPR) in EU countries, California Consumer Protection Act (CCPA) in USA and other countries' privacy protection regulations. Online services providers now have to pay great attention to the use of personal data in their system due to heavy penalty set down in GDPR and CCPA. On the other side, users generally don't want to disclose their personal data to the service providers due to privacy reasons, unless it is regulated by laws such as Know-Your-Customer (KYC) and Anti-Money-Laundering (AML) regulations.

Digital Asset is intangible asset in electronic/digital forms associated with or leading to a) an equivalence of monetary values; b) a right to acquire services or/and products; c) a proof of identity or access to other right(s). Different Digital Asset types are including but not limited to eGiftcard, eGift certificate, digital coupon, digital event ticket, digital sport ticket, digital transportation ticket, digital membership card, digital loyalty card, digital lottery ticket, digital wallet, digital password, digital pattern code, digital signature, and digital authentication token. Digital Asset provides the same rights or value as Physical Asset which is presented in physical, tangible forms.

The gift card industry alone is one of the biggest sectors in the finance industry in the U.S.A. Gift cards spending has grown from $83 billion in 2006 to over US$160 billion in 2018 in the U.S.A. alone while the worldwide gift card volume amounted to US$338 billion in the same year. Consumers love and hate gift cards because it is convenient to give and receive them but it is also inconvenient to carry different vendors' gift cards around for shopping. It is also too easy to forget, misplace or lose gift cards.

In the primary market, customers can buy gift cards in vendors' stores easily in the form of a plastic card with a machine-readable pin, usually covered with a coating where a customer can scratch it out to see said pin and present said pin for scanning by the cashier at the point of redemption. A significant percentage of gift cards remain unused for one or other reasons every year. In the secondary market, gift cards holders may wish to exchange or trade their unused gift cards from certain vendors for other preferred vendors but this task is not easy to be accomplished unless there is a reciprocal need within the reach of these unused gift cards holders. Some merchants offer to buy back the unused gift cards for a deep discount against cash and resell them in the secondary market. Some other vendors offer in a barter trade to exchange or trade-in the unused gift cards of third party vendors with certain discounts against their own gift cards at the value equal to the discount value of said unused gift cards. In general, the secondary market is not efficient, not user friendly, costly for users and privacy is not respected for all stakeholders including vendors, merchants and users.

On the other hand, the speculation on the resale of event tickets in the secondary market with exorbitant profit is uncontrollable and unlawful in certain countries. Said secondary market may nurture gangs of criminals entering in this highly profitable business with fake event tickets on circulation by harming the general public as well as the vendors of said event tickets.

The loss of Physical Asset is another unpleasant experience concerning everyone. Physical tickets or cards inside a personal wallet are gone once someone lost his/her wallet and most of time, said tickets or cards cannot be recovered.

By overcoming the disadvantages of Physical Asset, vendors adopt the use of Digital Asset such as a gift card in digital/electronic form (eGiftcard) distributed through a network of Internet to the customers, usually by email. Some vendors allow eGiftcard to be redeemed only for online shopping but not at physical stores. Other vendors ask eGiftcards holders to print out the eGiftcard received by email with the corresponding pin on paper for redemption at the cashier counter of vendors' physical stores by scanning said pin by the cashier. Some vendors offer eGiftcard stored in a smartphone and the pin assigned to said eGiftcard is shown on the display of said smartphone for scanning by the cashier at the point of redemption in the course of redemption of said eGiftcard. This redemption method lacks adequate security protections of the eGiftcards because the machine readable pin is visible and the accidental leaking of said pin leads to potential risk of hacking, unlawful pin duplication, and other fraudulent uses. For such eGiftcards, the advantages are clearly on the side of the vendors in the form of cost saving in printing and distribution of physical gift cards while the benefits and interest of the consumers in purchasing, exchanging and trading of said eGiftcards are not fully respected.

SUMMARY OF THE INVENTION

Due to the deficiencies of prior art mentioned above, the present invention provides a system and related methods for replacing Physical Asset with Digital Asset to increase security, respect personal privacy, enhance fraud prevention, enable tracing capability, improve user-friendliness, and lower the cost and increase the convenience in issuance, exchange, trade, redemption, validation and management of Digital Asset with "Privacy by Design" as core concept. The system of the present invention does not collect, store and process users' personal data in the course of accounts set-up and digital asset transactions.

The present invention focuses on a digital transformation from Physical Asset to Digital Asset in a secure, controllable, anonymous and user-friendly way without the use of personal data in the same way as people uses Physical Asset today. Nowadays no one asks you to disclose your personal data in buying or redeeming a gift card, a concert ticket, a sport event ticket or a restaurant coupon. A user may carry Physical Asset in his/her physical wallet, and similarly a user may carry Digital Asset in the digital wallet of said user's primary device, preferable a mobile device. One of the clear advantages of the present invention is that a user does not need to provide his/her personal data to set-up an online account with the system of the present invention for conducting a secure and anonymous exchange/trade of Digital Asset worldwide. Vendors of Digital Asset still have full controls of the Digital Asset after the sales in contrast to Physical Asset where its control is totally in the hands of the users who purchased/received the Physical Asset.

In the following context, a primary device by definition is a device which is primarily used by a user in his/her daily activities. A mobile device is a device where a user could carry it around, including but not limited to smartphone, tablet computer, notebook computer and wearables. The word "networked device" or 'device' is used hereafter to describe all electronic hardware with computing capability through application software installed and network connection capability via wire or wireless telecommunication networks.

In the first aspect of the present invention, a system is designed to operate as a computer server platform, preferably a backend cloud server platform, with processors, computer-readable memories connected to a network, called Digital Asset Exchange Platform (DAX Platform), that support the front end application through application programming software (DAX App) which is a front end client app downloaded and installed to a mobile phone or computer or a website access from a browser. Instead to create a user account using personal data of prior art, the present invention creates a device account of said primary device with DAX App installed using an irreversible function of unique device identifiers (UDID) for creating a unique anonymized data assigned as said device account name for registering Digital Asset under said device account in respect of "Privacy by Design" as core concept a) for helping vendors to sell and issue Digital Asset registered under device accounts of users' primary devices, preferable mobile devices, b) for helping users to purchase, exchange, trade, redeem and validate Digital Asset securely and anonymously on DAX Platform using DAX App installed in their primary devices, c) for recording all Digital Asset, transaction-related-data and transaction history in a central ledger of said system, d) for recording all Digital Asset, transaction-related-data and transaction history registered under a device account in each partial distributed ledger of a related user's primary device. DAX Platform and DAX App do not collect, store and process personal data of users. Details of the invention will be explained more in the section "Details Description of the Invention".

Transaction-related-data described herein comprises at least the device account of said digital asset, available value and balance of said digital asset at each of transactions, nature and item of said transactions, date and time of said transactions, location data including global positioning system (GPS) data of said transactions and other related information of said transactions. Transaction history describes the historical movement of Digital Asset been transferred from one device account to another device account in the course of purchase, receive, exchange, trade, redemption and validation of Digital Asset.

The concept of Digital Asset registered under "device accounts" instead of traditional "user accounts" from our logic thinking is that the set-up of user accounts of prior art is based on personal data including at least a telephone number or/and an email address and the set-up of device accounts is based on UDID including at least the International Mobile Equipment Identity (IMEI) or/and the Media Access Control (MAC) address of a primary device. In order to follow the guidance of "Privacy by Design" in GDPR toward anonymity, an irreversible function is used such as a hash function to hash at least one UDID for creating a hashed code which is assigned as the unique device account name (HUDA) for the device account of said primary device. HUDA is an anonymized data which is not considered as personal data under the definition of "Personal Data" in GDPR and other existing data protection regulations.

The present invention distinguishes the right-to-own from the right-to-use of a device in the age of Internet of Things (IoT). The first user who sets up a device account and registers successfully with DAX App acquires the right-to-use of DAX App installed in said primary device and said user becomes the authorized user. HUDA is unique for each device and Digital Asset registered under a particular HUDA can only be redeemed/validated using the primary device represented by said HUDA, except in critical situations described below. The use of device accounts instead of user accounts creates also an extra layer of security for managing Digital Asset on top of other security measures such as user's password/pattern code or answer to security question. If user password/pattern code was hacked and stolen, Digital Asset registered under a hacked device cannot be accessed and redeemed using any third parties' devices with the stolen password/pattern code as in contrast to systems of prior art. This inventive concept is fully different than the traditional concept of Digital Asset registered under a user account where hackers could access said user account using third party devices with the hacked login user account name or/and user password/pattern code.

Password usually refers to a string of numeric, alphabetic or alphanumeric characters, and pattern code usually refers to a pattern where a user draws the same pattern on the touch screen of a device each time to access certain functions of said device. A pattern can be drawn using line to connect dots displayed on the touch screen of a device such as the 9 separate dots arranged in 3 rows or 3 columns of 3 dots each.

BRIEF DESCRIPTION OF THE DRAWINGS

Embodiments of the present invention are described in more detail hereinafter with reference to the drawings, in which:

FIG. 6 shows one embodiment of a record of all device accounts with detailed information in the central ledger according to the system and methods of the present invention;

FIGS. 7A and 7B show one embodiment of the central ledger record of all transactions-related-data and transaction history of all Digital Asset registered under all related device account represented by their respective HUDA (Digital Asset based recording principle);

FIGS. 8A and 8B show one embodiment of partial distributed ledger records of all transactions-related-data and transaction history of all Digital Asset registered under each and every related device account represented by HUDA (HUDA based recording principle);

FIG. 9 shows the structure of central ledger of prior art;

FIG. 10 shows the structure of Blockchain (Distributed Ledger Technology) of prior art;

FIG. 11 shows one embodiment of a structure of DAX-CHAIN (Partial Distributed Ledger Technology) of the present invention and FIG. 12 shows one embodiment of a combined central ledger and DAXCHAIN structure of the present invention.

DETAILED DESCRIPTION OF THE INVENTION

In the following description, the present system and related methods, and the corresponding embodiments are set forth as preferred embodiments/examples. It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

Figure 1:
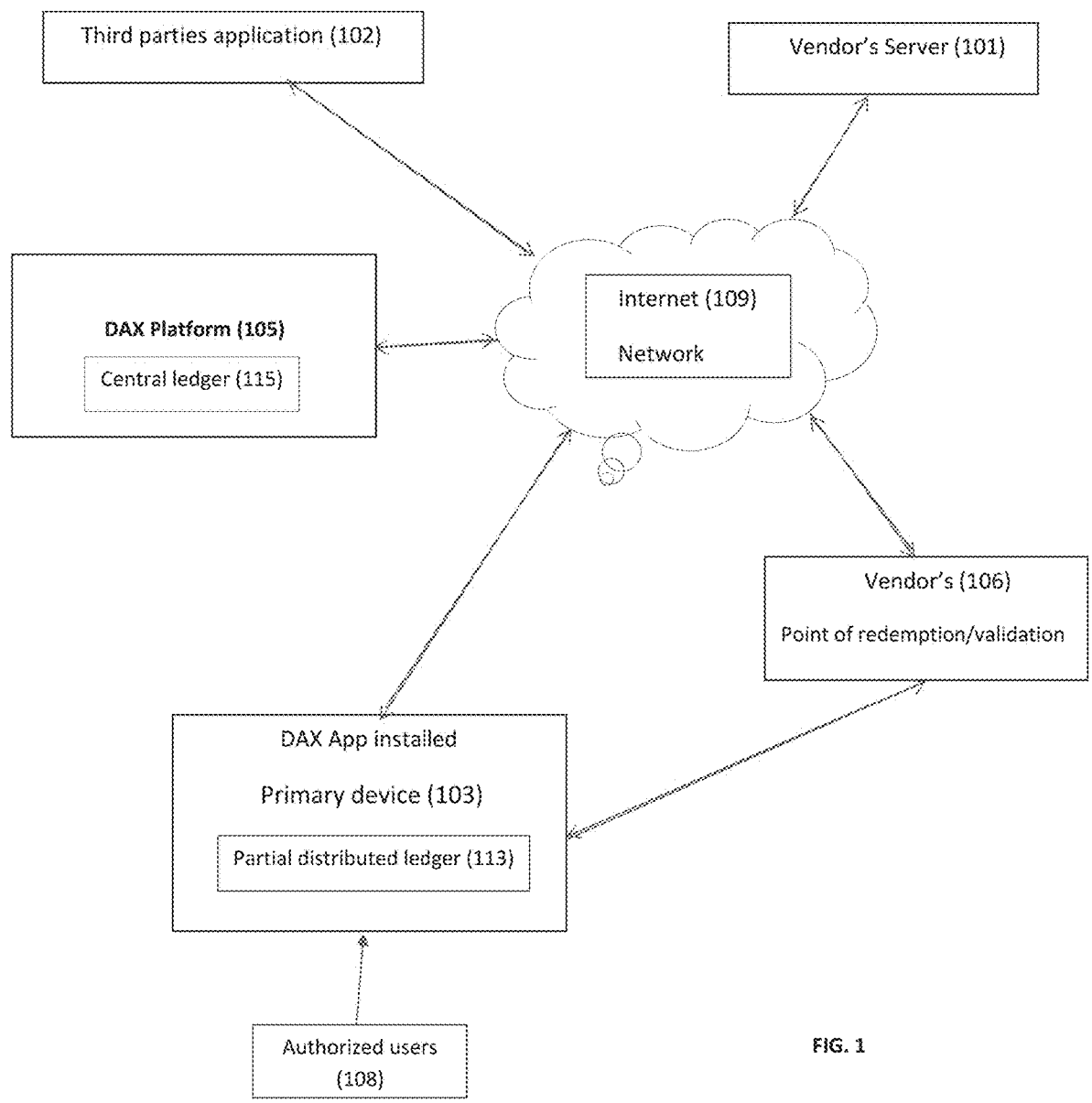
FIG. 1 schematically shows a communication network structure of the present system to connect a vendor server (101), third parties application server (102) and a primary device (103) with DAX Platform (105) over an internet network (109) as well as the connection of a Vendor's point of redemption/validation (106) with a vendor's server and the interaction between Vendors' point of redemption/validation and a primary device operated by an authorized user (108). The central ledger (115) is housed in one or more memories of DAX Platform while a partial distributed ledger (113) is housed in one or more memories of a primary device installed with DAX App.

In one embodiment/example, a network structure of DAX Platform with the central ledger and DAX App with the corresponding partial distributed ledger, vendors' servers, third parties' applications servers and users' devices via telecommunication network such as an internet is illustrated in FIG. 1. Said vendors' servers are connected to said vendors' cashier devices at the point of redemption/validation.

Figure 2:
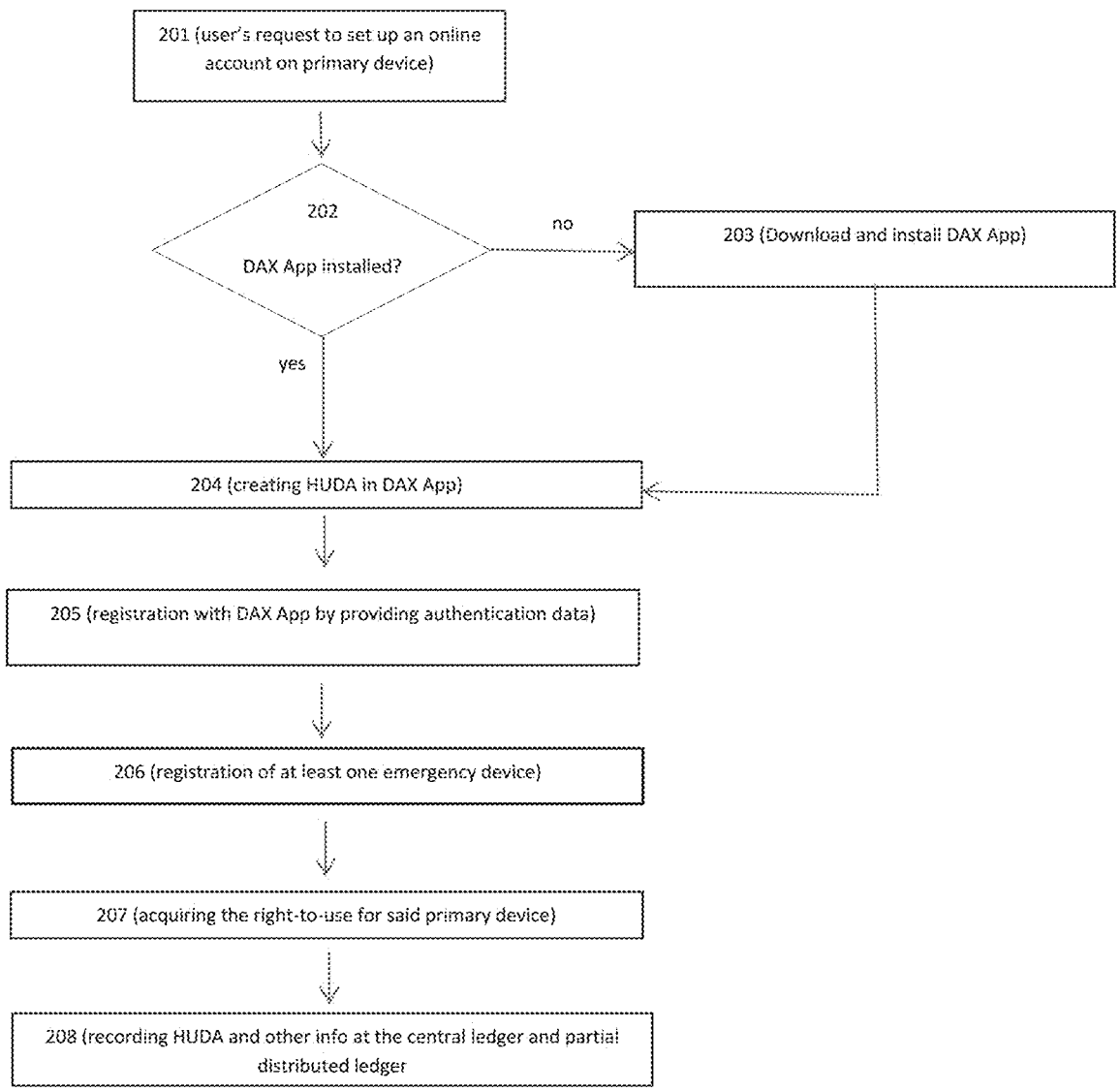
FIG. 2 is a flowchart showing how to register a primary device, set up a device account and acquire the right-to-use of DAX App through the present system according to an embodiment of the present invention.

In one of other embodiments/examples, FIG. 2 shows a flowchart describing the set-up process of a device account by a user of a primary device. The process of set-up a device account in the present invention is different from the process of set-up a user account of prior art. DAX App can be downloaded from the website of the online service provider applying the present invention or from App stores such as Play Store of Google, App Store of Apple or AppGallery of Huawei and installed into the primary device of a user. Instead of asking a user to select a unique user account name such as an email address or a cellphone number or an unique name suggested by said user for the approval of an online service provider of prior art, DAX App searches to collect at least IMEI or/and MAC address data of said primary device with the consent of said user and send said IMEI or/and MAC address data to DAX Platform which uses a predetermined irreversible function such as a hash function to calculate the hash code in function of at least one UDID. The calculated hashed code is then assigned as the device account name HUDA of said primary device. HUDA will be encrypted by DAX Platform to be sent back to DAX App for recording into the partial distributed ledger of said primary device while DAX Platform stores the encrypted HUDA in the central ledger. DAX Platform then starts the process of set-up a device account under said HUDA in communication with DAX App. Neither DAX Platform nor DAX App of said primary device store IMEI or/and MAC address of said primary device in the central ledger and in the partial distributed ledger, respectively. Said HUDA is unique in DAX Platform and DAX App of said primary device and HUDA is used to identify the device account of said primary device. HUDA is invisible for said user who should select an arbitrary name to represent the device account of his/her primary device. Such arbitrary name is for the sole use by said user in his/her primary device to identify the invisible HUDA representing the device account of said primary device. DAX Platform and DAX App use internally HUDA as the official device account name.

The next step is that said user needs to input at least 3 authentication data of a password, a pattern code and answer to security question or other security verification data provided internally by said primary device or by third party applications to his/her primary device for DAX App to be sent to DAX Platform. After completing the process of providing at least 3 authentication data, said device account represented by HUDA remains log-in in said primary device. For performing each transaction of redemption/validation of Digital Asset registered under the device account represented by HUDA of said primary device, said user needs to input each time at least one authentication data of password, pattern code or answer to security question into his/her primary device. This built-in security layer of Digital Asset associated with a device account of a primary device prohibits any devices other than said primary device to log-in into said device account to access and redeem Digital Assets registered under HUDA of said primary device in contrast to prior art where log-in can be performed using any network device with known user account name and password.

For the purpose of authentication and validation in critical cases such as loss of primary device with locking and unlocking function, upgrade to a new primary device with transfer of Digital Asset registered under the device account of the old primary device to the device account of the upgraded new primary device, resetting of forgotten password or pattern code or answer to security question, DAX App requires said user to nominate at least one emergency device with DAX App installed because DAX App and DAX Platform do not have the telephone number or the email address to send OTP to said user for reconfirmation. In said critical cases, said user could access and manage Digital Asset registered under the device account of his/her existing primary device using said nominated emergency device.

After completing the set-up process of device account, said first time user of DAX App acquires the right-to-use of DAX App installed in said user's primary device and becomes an authorized user of said primary device. The communication between DAX Platform and DAX App is via application programming interface (API) calls with end-to-end encryption. DAX App in the said primary device identifies itself with DAX Platform in API calls using HUDA stored in the memory of said primary device.

In one of other embodiments/examples, since HUDA representing the device account of each primary device is not visible to the authorized user of his/her primary device, the process of set-up a connection from one device account to another device account represented by their own HUDA respectively is made differently than the traditional method of prior art using mostly unique telephone number or email address. The establishment of a connection between 2 authorized users A and B is described as following: an authorized user A of a device account represented by HUDA (A) needs to establish a connection with a device account represented by HUDA (B) of authorized user B. Said user A could use his/her primary device with DAX App installed to generate a Quick Response (QR) code embedding the encrypted HUDA (A) in the form of a picture file format and to send it to said user B via third party instant communication methods such as WhatsApp, Wechat or email. Said user B will then import the received QR code file sent by said user A into the DAX App of his/her primary device and said DAX App will send the encrypted HUDA (A) to DAX Platform with the request to connect to said user A with a device account represented by HUDA (A). DAX Platform then adds said user A into the list of known users of user B and said user B into the list of known users of user A. Vice versa, this process could be initiated by said user B by sending a generated QR code to said user A. If said user A is located physically next to said user B, then said user A could use DAX App installed in his/her primary device to scan the QR code generated by said user B displayed on the screen of the primary device of said user B and vice versa. DAX Platform then updates the central ledger with the updated list user of user A and user B, and distributes the updated list known user of user A into the partial distributed ledger of primary device A and the updated list user of user B into the partial distributed ledger of primary device B.

In one of other embodiments/examples, the process of nomination of an emergency device of authorized user A of a device account represented by HUDA (A) is straight forward once the establishment of a connection between user (A) of a primary device A and user (B) of device account represented by HUDA (B) of the primary device B is completed, whereas the primary device B is a targeted emergency device nominated by the primary device A. DAX App of the primary device A of user A sends a request to DAX Platform to nominate the primary device B from the list of known users of primary device A as an emergency device of the primary device A of user A. DAX Platform then sends this request to DAX App of the primary device B for approval. Once user B accepts this request through the DAX App installed in the primary device of user B, the acceptance message will be sent from DAX App of primary device B to DAX Platform which records HUDA (B) representing the primary device B as emergency device of HUDA (A) representing the primary device A in its central ledger and distributes this information into the partial distributed ledger of primary device A and the partial distributed ledger of primary device B. An acknowledgement message will be sent from DAX Platform to DAX App of the primary device of user A that the nomination of primary device B is accepted by user B.

The nominated emergency device B is in use when said user A lost or misplace his/her primary device A and needs to access and redeem his/her Digital Asset registered under the device account represented by HUDA of his/her lost primary device A. DAX App installed in the nominated emergency device B provides an emergency function to let said user A temporally access his/her HUDA account of the lost primary device by entering at least 2 pre-registered authentication data of password, pattern code or answer to security question.

DAX App sends those 2 entered authentication data to DAX Platform for verification. Upon approval, DAX Platform locks the DAX App installed in the lost or misplace primary device and allows temporally said user A using the nominated emergency device to access or/and redeem his/her Digital Asset registered under the device account represented by HUDA of the lost primary device. DAX Platform could restrict the number of times said user A could use the nominated emergency device before said user A registering a new device for replacing the lost primary device.

Once said DAX App of said lost primary device was locked by DAX Platform, if said user A re-finds the lost primary device and wishes to unlock DAX App in said lost primary device which was locked by DAX Platform, said user A shall use DAX App of the nominated emergency device B to send a request to DAX Platform for unlocking his/her re-founded primary device by entering at least 2 pre-registered authentication data of password, pattern code or answer to security question. DAX Platform compares the 2 send-in authentication data with the pre-registered authentication data stored in the central ledger of DAX Platform. Upon approval, DAX Platform send an unlocking message to DAX App installed in the lost but re-founded primary device so that said DAX App is on again.

If user A upgrades to a new primary device and wishes to transfer the Digital Asset from his/her old primary device to the new primary device, said user A needs to set-up a device account of his/her new primary device and nominates at least one emergency device according to the procedure of set-up device account described above. Said user A needs to nominate one emergency device which is the same emergency device of his/her lost primary device, in this case it is the emergency device B. Then said user A could uses DAX App of the nominated emergency device B by entering at least 2 authentication data of password, pattern code or answer to security question to send to DAX Platform the request of transfer Digital Asset registered under the device account of his/her old primary device to the new device account of the new primary device. Upon approval, DAX Platform locks the DAX App installed in the old primary device and transfers said Digital Asset registered under HUDA of the old primary device to the HUDA of the new primary device and updates its central ledger and distributes this updated information to the partial distributed ledger of the new primary device.

If a third party user, said a friend or a family member of user A, wishes to take over possession of the old primary device after user A completed the transfer of Digital Asset from said old primary device to the new primary device and said third party user wishes to use DAX App locked in said old primary device. Said third party user needs to de-install DAX App first, then download and install a new DAX App from App stores into said old primary device for setting up a new device account using said third party's own authentication data of password, pattern code and answer to security question comparable to the process of set-up a new device account in a brand new primary device.

In one of other embodiments/examples, a user attempts to purchase a Digital Asset as an eGiftcard from a vendor listed on DAX App of his/her primary device. Said user selects a Digital Asset displayed on the screen of his/her primary device. DAX App sends the request to DAX Platform which manages the payment process of said user via DAX App. Once said user successfully completed the payment of said selected Digital Asset, DAX Platform sends the request to the corresponding vendor server for purchasing said selected Digital Asset and effects the payment. After completion of the payment, DAX Platform receives from the corresponding vendor server a token, including but not limited to barcode or QR code. This token is representing said selected Digital Asset purchased by said user. DAX Platform records this token of said Digital Asset under the device account represented by HUDA of the primary device of said user in the central ledger as well as in the partial distributed ledger of the primary device of said user.

In one of other embodiments/examples, the redemption/validation of Digital Asset is preferably performed by using DAX App in the primary device of a user to scan QRRV code provided by the vendor at the point of redemption/validation. QRRV is a machine-readable code, including but not limited to quick respond (QR) code, is provided by the vendor at a point of redemption/validation which contains at least information about the details of the cashier machine for redemption/validation, the location of said point of redemption/validation, vendor/merchant details and other related information. The redemption/validation function of DAX App in said primary device is preferable to be activated by QRRV code of the vendor and not by the user of said primary device. The advantage to use DAX App for scanning said QRRV code is that DAX Platform could verify if the request is from DAX App installed in the primary device with its proper HUDA associated with said Digital Asset represented by the corresponding token to be redeemed. In this case, said corresponding token is invisible to the user of said primary device as well as to the cashier at the point of redemption/validation during the course of redemption of said Digital Asset so that the misuse of said token is practically impossible. In contrast, if the scanning is performed by the vendor at the point of redemption/validation, vendor's token has to be displayed on the screen of said mobile device upon the activation by the user, thus a risk of duplicating or misuse of token by said user or by a hacker with stole token as in the cases of prior art could pose security problems for said user as well as for the vendor of said Digital Asset represented by its token.

After scanning QRRV code, DAX App requests the authorized user of said primary device to input at least one authentication data of password or pattern code which will send from DAX App to DAX Platform for verification. Upon approval, DAX Platform sends to DAX App a list of available Digital Asset registered under HUDA of said primary device allowed to be redeemed/validated at said point of redemption/validation for displaying on the screen of said primary device. Said authorized user selects one Digital Asset to be redeemed and DAX App sends to DAX Platform a redemption/validation request of a selected Digital Asset represented by its token registered under HUDA of said primary device. DAX Platform compares the send-in token by DAX App with the list of Digital Asset represented by token and registered under the device account of the primary device of said user recorded in its central ledger. Upon approval, DAX Platform sends the token of said Digital Asset to the related Vendor Server for redemption/validation. Said Vendor Server checks said token and upon approval, said Vendor Server sends the authorization message of the redemption/validation to the cashier machine at the point of redemption/validation of said vendor as well as sends a message to DAX Platform about the approval and the details of the transaction. DAX Platform records the updated information in the central ledger as well as distributes this updated information to DAX App for recording in the partial distributed ledger of said primary device represented by its corresponding HUDA. The whole process is automated after scanning QRRV code without disclosing the token at the point of redemption/validation.

Figure 3A:
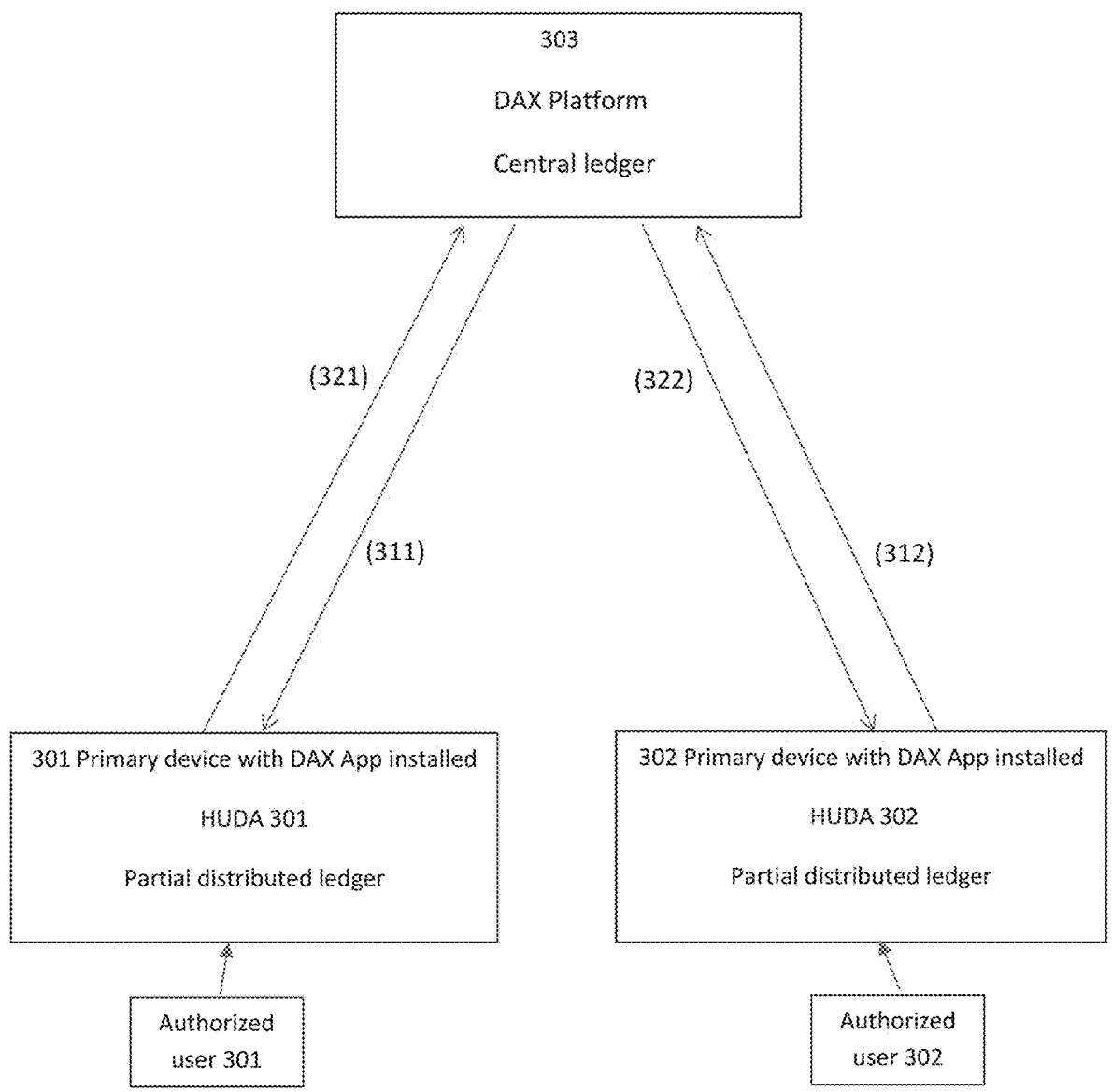
FIG. 3A schematically shows the communications between two authorized users of DAX App to execute a exchange/trade through buying/selling Digital Asset using the present system according to certain embodiments of the present invention.

In one of the other embodiments/examples, the process of Digital Asset exchange/trade between two users, user of HUDA (301) or user 301 and user of HUDA (302) or user 302, using the exchange place of DAX Platform (303) to advertise offer and demand securely and anonymously is illustrated in FIG. 3A. User 301 put up an offer to DAX Platform using DAX App installed in his/her primary device for sale of Digital Asset represented by token (A), recorded under HUDA (301), as a gift card of vendor A with a value of 100$ at a discounted price for 85$ [321]. DAX Platform records the offer of user 301 into the list of offers (offers list) on a chronological order in one of the memories of DAX Platform. On the other hand, user 302 put up a demand to DAX Platform using DAX App of user 302's primary device to buy Digital Asset represented by token (A) as a gift card of vendor A at most 80% of the face value of token (A) [312]. DAX Platform records the demand of user 302 into the list of demands (demands list) on a chronological order in one of the memories of DAX Platform. DAX Platform selects from the offers list an offer in the chronological order and in this case it is in the turn of user 301's offer to be considered. DAX Platform selects in the demands list an offer to be best matched with the offer of user's 301 and found the demand of user 302 been the best choice from the demands list and presents said demand to user 301 through DAX App of user 301's primary device for approval if user 301 could accept to pay 80$ for the token (A) of 100$ value. If user 301 accepts it, then DAX Platform informs user 302 about the acceptance. Once user 302 accepts to buy the token (A) of face value 100$ for 80$, then DAX Platform collects the payment from user 302 of 80$ and pay 80$ to user 301 [311] while performing the transfer of Digital Asset by recording the token (A) under HUDA (302) [322] and canceling said the token (A) under HUDA (301). DAX Platform then updates this change in the central ledger as well as distributes this change to DAX App of the two primary devices of user 301 and 302 for recording into the two device accounts represented by HUDA (301) and HUDA (302) stored in the two corresponding partial distributed ledgers of the two primary devices of user 301 and 302, respectively. Both users, 301 and 302, are not in direct contact and anonymous to each other. The process of exchange/trade is performed by DAX Platform and the related DAX App by selecting on a first-come-first-served basis an offer in the offers list in chronological order to be matched with the best demand to said offer in the demands list. Vice versa, the process of exchange/trade could be performed by DAX Platform and the related DAX App by selecting on a first-come-first-served basis a demand in the demands list in chronological order to be matched with the best offer to said demand in the offers list.

Figure 3B:
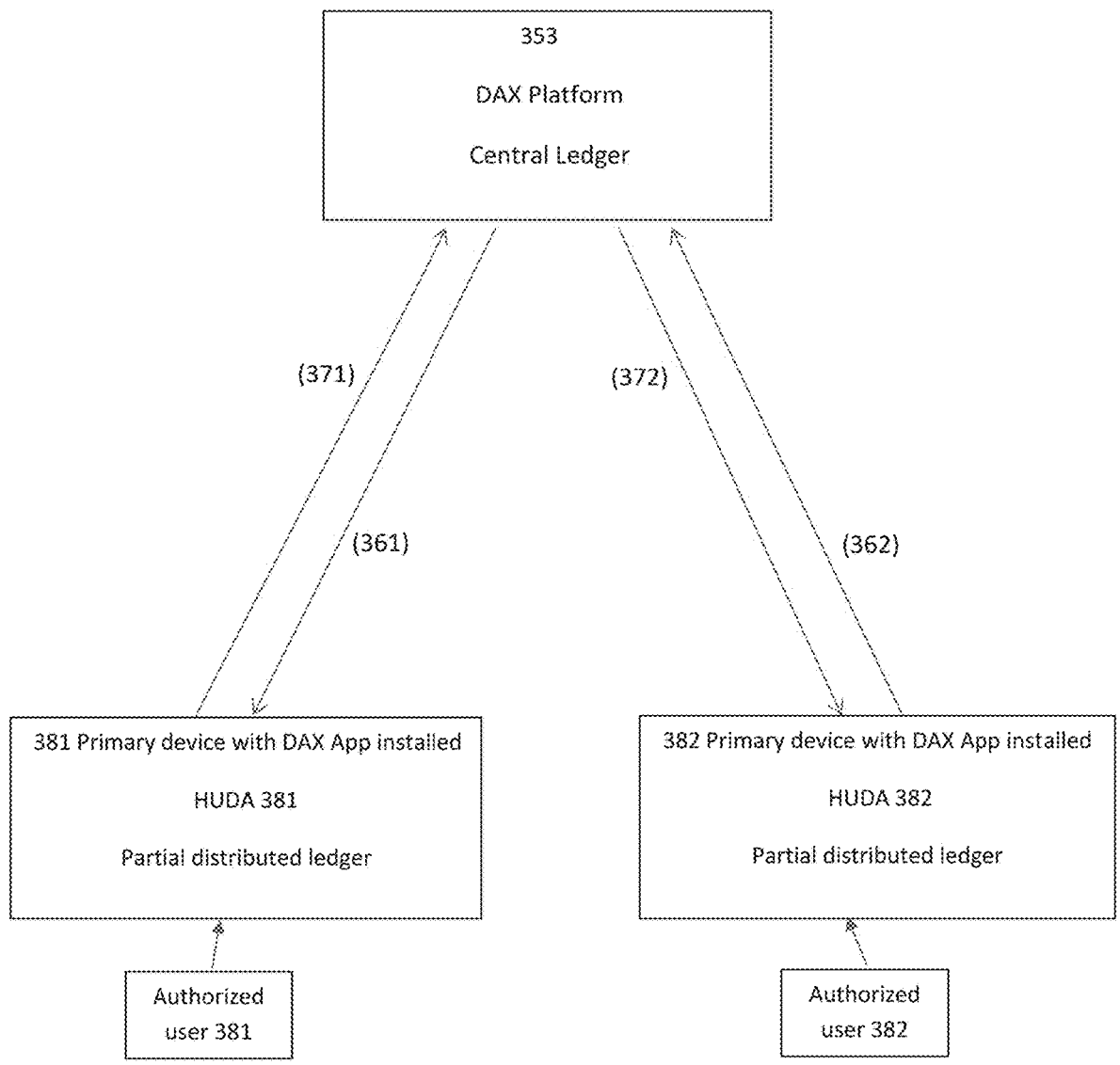
FIG. 3B schematically shows the communications between two authorized users of DAX App to execute a barter trade of Digital Asset through the present system according to certain embodiments of the present invention.

FIG. 3B describes the process of a barter trade of Digital Asset between two users, user of HUDA (381) or user 381 and user of HUDA (382) or user 382, using the exchange place of DAX Platform (353) to advertise offers and demands anonymously. User 381 puts up to DAX Platform using DAX App installed in his/her primary device an offer of Digital Asset represented by the token (A) as a gift card of vendor A with a value of 100$ in exchange of a gift card of vendor B for same or similar value [371]. DAX Platform records this request into the barter trade list in one of the memories of DAX Platform. On the other hand, user 382 puts up to DAX Platform using DAX App installed in his/her primary device an offer of Digital Asset represented by the token (B) as a gift card of vendor B with a value of 95$ in exchange of a gift card of vendor A for same or similar value [362]. DAX Platform serves the barter trade list of users on the first-come-first-served basis in chronological order and search for the best match of two users. In this example, DAX Platform sends a message via DAX App to user 381 for asking if he/she accepts gift card of 95$ for exchange with his/her gift card of vendor A of 100$ value [361] as well as a message via DAX App to user 382 for asking if he/she accepts gift card of vendor A of 100$ for exchange with his/her gift card of vendor B of 95$ value [372]. If both users 381 and 382 accept the deal, then DAX Platform performs the transfer by recording the token (A) under HUDA (382) and the token (B) under HUDA (381) in the central ledger as well as distributing this updated information via DAX App in the partial distributed ledgers of HUDA (382) and HUDA (381) in the user 382 and user 381 primary devices, respectively. Both users, 381 and 382, are not in direct contact and anonymous to each other. The process of exchange/trade is performed by DAX Platform and the related DAX Apps on a first-come-first-served basis in chronological order for searching the best match between users in the barter trade list.

Figure 4:
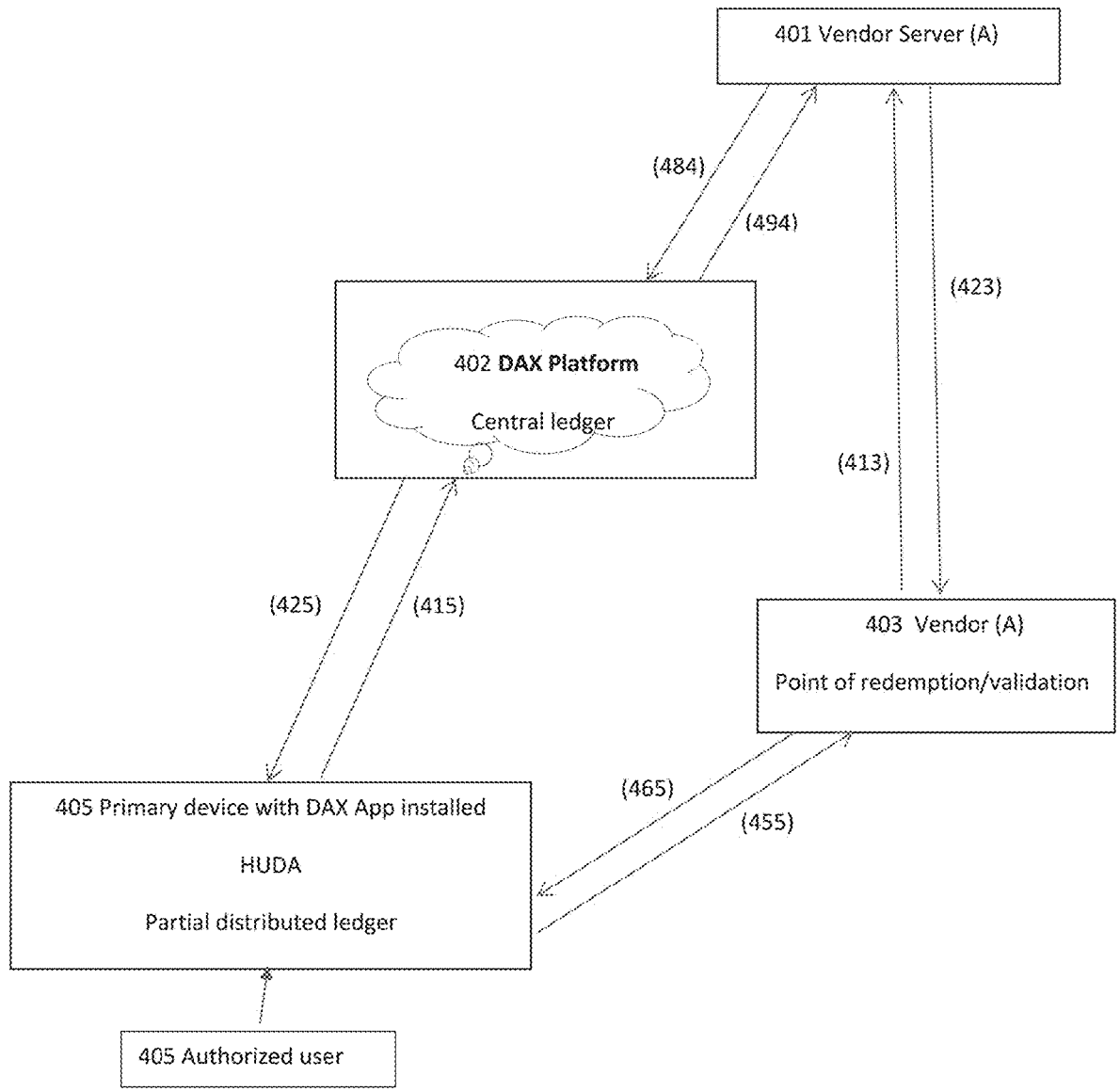
FIG. 4 schematically shows how one authorized user redeems a Digital Asset at the point of redemption/validation of the present system according to an embodiment of the present invention.

In one of other embodiments/examples, an authorized user 405 of primary device 405 performs a redemption of Digital Asset of the token (A) as an eGiftcard [455] at the point of redemption 403 of a vendor (A) is illustrated in FIG. 4. At the point of redemption, said user 405 scans said QRRV code displayed at the point of redemption using the scan function of DAX App [465]. DAX App in the primary device 405 asks said user to enter the amount for the payment of his/her bill using a gift card listed in his/her digital wallet of DAX App and then enter a password/pattern code for approval of said payment. DAX App then sends all those redemption information together with the entered password/pattern code to 402 DAX Platform for authentication [415]. DAX Platform verifies the received information with the record in the central ledger. Upon approval, DAX Platform sends the token (A) representing said gift card to 401 Vendor Server (A) for redemption of the amount entered by said user [494]. Upon the approval by 401 Vendor Server (A), the cashier machine at the point of redemption (403) receives the approval for redemption of said amount from the gift card represented by the token (A) [423]. The balance of said gift card represented by the token (A) will be updated in the 401 Vendor Server (A), which will inform DAX Platform [484] which in its turn updates the central ledger record and the partial distributed ledger resided in the primary device simultaneously [425]. During the whole process of redemption, the token (A) is not displayed and not visible for all parties at the point of redemption for security reasons.

Figure 5:
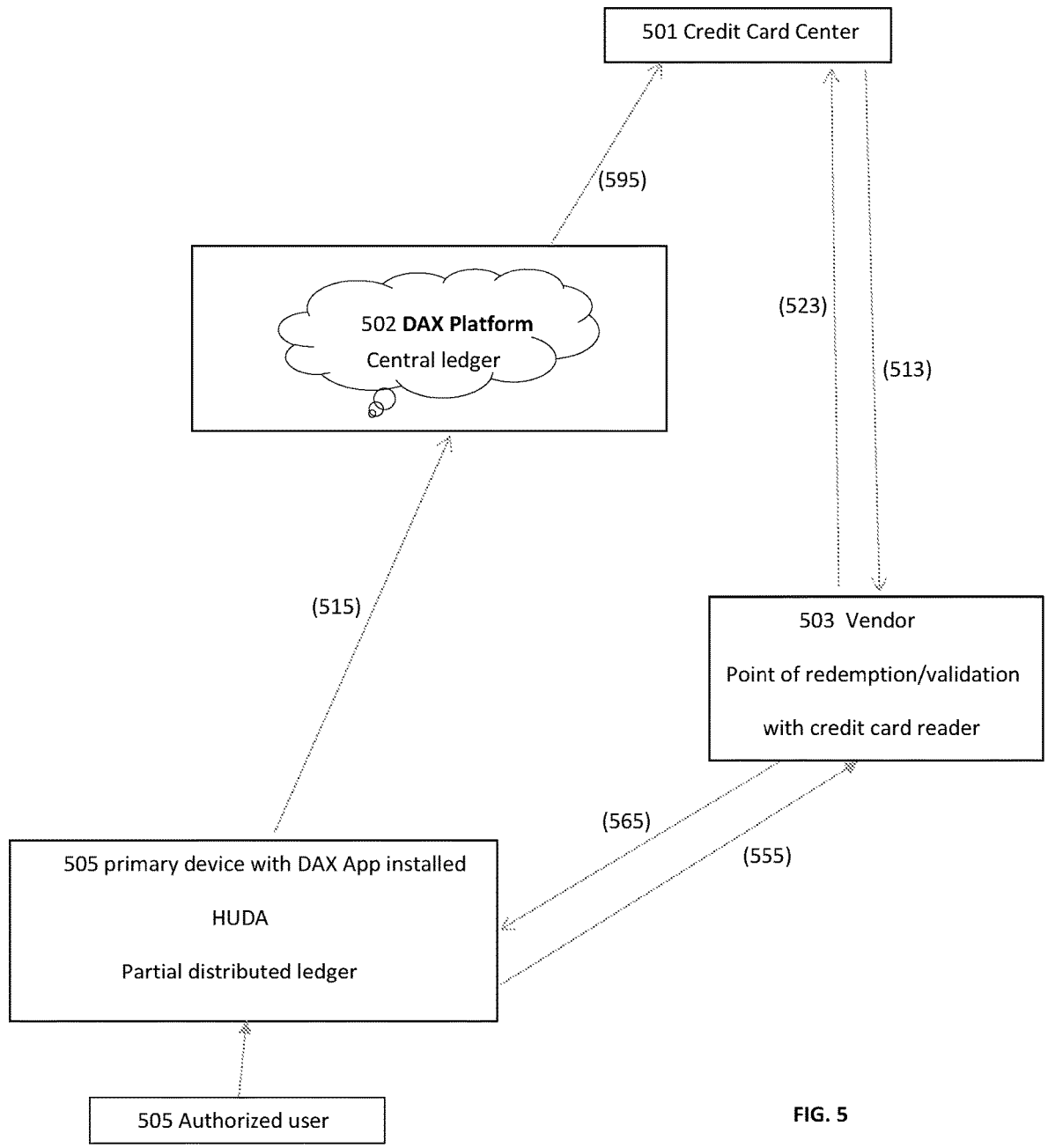
FIG. 5 schematically shows a security code validation process by vendor server using DAX App for physical credit card payment according to the system and methods of the present invention.

In one of the other embodiments/examples, an authorized user 505 of FIG. 5 requests the use of a physical credit card for payment associated with a security code in the form of password/pattern code validation at the point of redemption 503 [555] whereas the credit card reader connected to the credit card network does not have the means to input said security code. A credit card reader is used read said credit card code and sends the amount to be paid by said credit card and other information to credit card center 501 for approval [523]. A specialized QRRV code designed for credit card security code verification at the point of redemption 503 is scanned by a primary device of said user 505 using DAX App [565]. Said user then selects on the screen of his/her primary device the credit card represented by the token (A) for payment and inputs a security code on said screen. A token is used for hiding the information of said credit card. Said token is registered under the device account represented by HUDA of the primary device of said user and recorded in the partial distributed ledger of said primary device. Said token is preferably the hash code of a hash function of said credit card information with its card number and other related details. Said security code is then sent together with the related token to DAX Platform 502 by DAX App in the primary device of said user [515]. DAX Platform then sends the security code with its related token to the credit card center 501 which matches the sent-in security code with the pre-registered security code of the corresponding credit card represented by said token [595]. Upon approval, said credit card center 501 sends an approval code to the credit card reader at the point of redemption 503 for execution of the payment by said credit card [513]. DAX App and DAX Platform help the credit card center to verify a password/pattern code in association with the credit card over the internet with end-to-end encryption in the case that the credit card reader connected to a credit card network at said point of redemption does not have the means to input security code associated with a credit card as an extra layer of security in payment with credit card.

In one of other embodiments/examples, FIG. 6 illustrates the details of all device accounts represented by their unique HUDA are stored in the central ledger according to the principle of Digital Asset based data recording. For example, HUDA HK3786 represents the primary device of an authorized user but unknown by said authorized user who names said primary device as "Maxi". Said authorized user registered with DAX App at the first time in 01/01/2019 at 13:20:20 and at the location with GPS data of GPX HK1234. Said authorized user nominates a primary device represented by HUDA HK0139 (Ruby) as his/her emergency device. The actual location of said primary device of said authorized user is at GPX HK2468.

In one of other embodiments/examples, the recording of Digital Asset registered under device accounts represented by their respective HUDA in the ledger is divided into 2 principles: a) recording all transaction-related-data and transaction history of all Digital Asset registered under all device accounts represented by their unique HUDA as one full ledger (Digital Asset based data recording) and b) recording all transaction-related-data and transaction history of all Digital Asset registered under each device account represented by its HUDA (HUDA based data recording). While the central ledger in one or more memories of DAX Platform performs the recording principle of Digital Asset based data recording, DAX App installed in each primary device performs the principle of HUDA based data recording in its partial distributed ledger in one or more memories of said primary device. More details are explained in the following examples illustrated in FIG. 7 and FIG. 8.

FIGS. 7A and 7B illustrate the details of all Digital Asset registered under different device accounts are stored in the central ledger of DAX Platform (Digital Asset based data recording).

Hereafter the example of Digital Asset represented by the token 23458 recorded in the central ledger of DAX Platform is explained in details. The token 23458 is a gift card with an initial value 50$ and purchased by the user of HUDA HK3786 at location GPX HK1234 and timestamp 05/04/2019 09:30:01 from vendor A (transferor). User of HUDA HK3786 (transferor) at location GPX HK4562 and timestamp 12/04/2019 13:36:20 transfers said gift card of the token 23458 of 50$ value to user of HUDA HK0238 (transferee). User of HUDA HK0238 at location GPX HK3421 (different than the location of said transferor) and timestamp 12/04/2019 13:36:21 (1 second later) receives said gift card of the token 23458 with the balance of 50$ (same as the initial value). User of HUDA HK0238 spends 10$ to buy cloths at vendor A shop with location GPX HK7489 and timestamp 15/04/2019 12:30:09, the balance of said gift card is now 50$-10$=40$. At location GPX HK3416 and timestamp 10/05/2019 10:09:55, user of HUDA HK0238 spends 5$ to buy food at vendor A shop, the balance of said gift card is now 40$-5$=35$. User of HUDA HK0238 (transferor) at location GPX HK2365 and timestamp 28/10/2019 11:32:09 transfers said gift card of the token 23458 to user of HUDA HK0139 (transferee). User of HUDA HK0139 at location GPX HK4563 and timestamp 28/10/2019 11:32:10 (1 second later) receives said gift card of the token 23458 with the balance of 35$. User of HUDA HK0139 spends 10$ to buy foods at vendor A shop with location GPX HK4896 and timestamp 30/10/2019 13:36:20, the balance of said gift card is now 35$-10$=25$. At location GPX HK7843 and timestamp 10/11/2019 17:20:01, user of HUDA HK0139 spends 25$ to buy sport item at vendor A shop, the balance of said gift card is now 25$-25$=0$, said gift card of the token 23458 is now fully redeemed. This example shows one of the other embodiments/examples of a detailed record of Digital Asset represented by the token 23458 of the issuance by vendor A until it is fully redeemed in the central ledger of DAX Platform.

FIGS. 8A and 8B illustrate the details of all Digital Asset registered under each device account represented by its HUDA are stored in the corresponding partial distributed ledger of said HUDA according to the principle of HUDA based data recording.

Hereafter the tracking of transaction history of Digital Asset represented by the token 23458 representing a gift card with an initial value of 50$ are explained in details. In the partial distributed ledger of HUDA HK3786, the purchase of the token 23458 from vendor A is recorded at location GPX HK1234 and timestamp 05/04/2019 09:30:01 which is the same record in the central ledger of Digital Asset represented by the token 23458. User of HUDA HK7386 (transferor) transfers said gift card to user of HUDA HK0238 (transferee) at location GPX HK4562 and timestamp 12/04/2019 13:36:20, the same record can be found in the central ledger under Digital Asset represented by the token 23458. Considering the partial distributed ledger of HUDA HK0238 and the tracking of the Digital Asset of the token 23458, at the location GPX HK3421 and timestamp 12/04/2019 13:36:21, the token 23458 with a value of 50$ is credited into HUDA HK0238, the same record can be found in the central ledger under Digital Asset represented by the token 23458. User of HUDA HK0238 spends 10$ to buy cloths at vendor A shop with location GPX HK7489 and timestamp 15/04/2019 12:30:09, the balance of said gift card is now 50$-10$=40$. At location GPX HK3416 and timestamp 10/05/2019 10:09:55, user of HUDA HK0238 spends 5$ to buy food at vendor A shop, the balance of said gift card is now 40$-5$=35$, the same record can be found in the central ledger under Digital Asset represented by the token 23458. User of HUDA HK0238 (transferor) at location GPX HK2365 and timestamp 28/10/2019 11:32:09 transfers said gift card of the token 23458 to user of HUDA HK0139 (transferee), the same record can be found in the central ledger under Digital Asset represented by the token 23458. Considering the partial distributed ledger of HUDA HK0139 and the tracking of the Digital Asset represented by the token 23458, user of HUDA HK0139 at location GPX HK4563 and timestamp 28/10/2019 11:32:10 (1 second later) receives said gift card of the token 23458 with the balance of 35$. User of HUDA HK0139 spends 10$ to buy foods at vendor A shop with location GPX HK4896 and timestamp 30/10/2019 13:36:20, the balance of said gift card is now 35$-10$=25$. At location GPX HK7843 and timestamp 10/11/2019 17:20:01, user of HUDA HK0139 spends 25$ to buy sport item at vendor A shop, the balance of said gift card is now 25$-25$=0$, said gift card of the token 23458 is now fully redeemed, the same record can be found again in the central ledger under Digital Asset represented by the token 23458.

From the two examples of the recording of the token 23458, all transaction-related-data and transaction history of the token 23458 can be traced easily in the central ledger as well as in three different partial distributed ledgers of three primary devices with their corresponding devices accounts represented by HUDA HK7386, HUDA HK0238 and HUDA HK0139.

In one of the other embodiments/examples, FIG. 9 schematically shows a central ledger connected with node 1, 2, 3 . . . n and FIG. 10 schematically shows a Blockchain of distributed ledger technology (DLT) structure of fully distributed ledgers where each node 1, 2, 3 . . . n stores the same duplicated copy of the entire full ledger as prior art. The major advantages of the recording with Blockchain structure are well known in which each new transaction or change is recorded in a new block represented by a hash code linked with the previous block by hashing the hash code of said previous block together with the contents of the present block so that it is not possible to modify the content of each block without breaking the Blockchain link. Each user of a node can access to all contents stores in the Blockchain.

In one of the other embodiments/examples, FIG. 11 schematically shows the inventive DAXCHAIN structure of partial distributed ledger technology (PDLT) where each node 1, 2, 3 . . . n, representing one device account by its unique HUDA, stores only a partial distributed ledger of the entire full ledger where each new transaction or change related to the contents of a node or device account is recorded in a new block represented by a hash code linked with the previous block by hashing the hash code of said previous block together with the contents of the present block in said node. It is not possible to modify the content of each block without breaking the DAXCHAIN link. Said partial distributed ledger comprises all transaction-related-data and transaction history of all Digital Asset registered in said particular node or device account in the DAXCHAIN.

A user of each node or a user of each primary device with its device account represented by HUDA can only access to all contents under the device account of his/her primary device.

In summary, DAXCHAIN is similar as Blockchain in the formation of each block and the way to link all blocks together in the chain. The main difference between DAX-CHAIN and Blockchain is that each node of Blockchain can access the full distributed ledger while each node of DAX-CHAIN can only access a partial distributed ledger comprising only all contents related to said particular node.

All transaction-related-data and transaction history of all device accounts recorded in all partial distributed ledgers in all primary devices (nodes) in a DAXCHAIN structure, when grouping together, are equal to all transaction-related-data and transaction history of all device accounts recorded in the central ledger of DAX Platform. Practically the central ledger can be completely rebuilt by uploading all contents in all partial distributed ledgers in the primary devices of all users with DAX App installed.

FIG. 12 illustrates the structure of the combination of the central ledger plus the partial distributed ledgers and the recording details of a Digital Asset are explained in the following example:

An example of Digital Asset as an eGiftcard of a vendor A with a value of 50US$ (token 23458) is taken into consideration. A user purchased said eGiftcard through a primary device with DAX App installed wherein said eGiftcard is registered in the partial distributed ledger under the proper HUDA HK3786 of said primary device with the proper token representing said eGiftcard, and purchase and payment details of this transaction. At the same time this information is recorded in the central ledger of DAX Platform databases. User (A) sends said gift card via DAX Platform to a friend [HUDA HK0238] as a gift. While DAX Platform records all details of these Digital Asset transaction-related-data in its central ledger, DAX App at device (HUDA HK0238) records HUDA of device (HUDA HK0238) as transferee, the corresponding token 23458 and the value 50$ of said gift card. DAX App at mobile device (HUDA HK0238) records HUDA of mobile device (HUDA HK3786) as transferor, the corresponding token 23458 and the value 50$ of said eGiftcard. User (HUDA HK0238) used said gift card two times to purchase goods at vendor shop X at the value of 10$ and vendor shop Y at the value of 5$ at the point of redemption/validation. The value remaining in the gift card is now 50$−10$−5$=35$. The details of these 2 transactions and the rest value of 35$ are recorded in the central ledger of DAX Platform as well as in the partial distributed ledger of device (HUDA HK0238). Now said user of device (HUDA HK0238) wants to transfer this eGiftcard with rest value of 35$ to his son using primary device [HUDA HK0139] as a reward of his good homework mark at the school. DAX App of HUDA HK0238 records HUDA HK0238 as transferor and HUDA HK0139 as transferee together with the token 23458 representing said gift card and 35$ value as the balance in said gift card. This procedure of Digital Asset been transferred from one HUDA to another HUDA repeats until the value of the gift card becomes null. The whole history of transaction-related-data from said eGiftcard represented by the token 23458 is recorded in the central ledger of DAX Platform while each and all participants of these transactions, namely devices with HUDA HK3786, HK0238, HK0139 . . . , record part of transaction-related-data in their proper partial distributed ledgers. Since transaction-related-data and transaction history of the transferors, the transferees and the related Digital Asset represented by the token are stored in the partial distributed ledgers of each related primary devices, the reconstruction of the central ledger is thus possible in collecting all information recorded in all partial distributed ledgers of all primary devices installed with DAX App.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments/examples were chosen and described in order to best explain the principles of the invention and its practical application, thereby enabling others skilled in the art to understand the invention for various embodiments/examples and with various modifications that are suited to the particular use contemplated. It is intended that the scope of the invention be defined by the following claims and their equivalence.

The invention claimed is:

1. A system for securely and anonymously exchanging or trading a digital asset between two users where the digital asset is not associated with either user's user account, the system comprising:

one or more computer processors, and one or more computer-readable memories, including program instructions and data stored in the one or more computer-readable memories, the one or more processors configured to execute the program instructions to cause the system to perform the operations comprising:

setting up a device account for a primary device of a first user upon a first-time registration with the system through an application programming software installed in the primary device of the first user connecting to the system via a network, setting up a device account for a primary device of a second user upon a first-time registration with the system through an application programming software installed in the primary device of the second user connecting to the system via said network, registering said digital asset with the system under the device account of the first user upon a purchase or gift of the digital asset by the first user through the system, transferring the digital asset from the device account of the first user to the device account of the second user upon initiation of a trade or exchange of said digital asset in the system, and recording transaction-related-data and transaction history in said one or more computer-readable memories of the system, and in one or more computer-readable memories of the primary device of the first user and in one or more computer-readable memories of the primary device of the second user, respectively, wherein the system uses anonymized information to conduct the operations of setting up device accounts for the primary devices of the first and second users, and to conduct transactions of digital assets of the users registered with the system, wherein the one or more computer processors comprise:

a first computer processor configured to communicate with a selected vendor's system to send and receive said digital asset issued by the selected vendor in the form of a token and in the course of redemption of said digital asset, receive an updated balance value of said digital asset from said selected vendor's system;

a second computer processor configured to, for each of the first and second users, communicate with the respective application programing software installed in respective primary devices of respective users to register and identify respective device accounts of the respective primary device of the respective users with the system using a unique device account name (HUDA) representing the respective device accounts for sending and receiving authentication, verification and transactional messages between the system and the respective primary device of the respective user, and wherein said HUDA is a code calculated from an irreversible function of at least one of unique device identifiers of the respective primary device of the respective user; and a third computer processor configured to manage and record transaction-related-data and transaction history of the purchase/issuance, exchange, trade, redemption or validation of said digital asset registered under a device account using a central ledger located in said one or more computer-readable memories of the system and a partial distributed ledger located in said one or more computer-readable memories of the respective primary device of the respective user, wherein the system further comprises:

at least one timer for setting a time interval for each of the communications processed through the first, the second, and the third computer processors, wherein said one or more computer-readable memories comprise:

a first computer-readable memory in which at least one device account, said digital asset and transaction-related-data and transaction history associated with said digital asset in the central ledger of the system are stored; and a second computer-readable memory in which at least one device account, said digital asset and transaction-related-data and transaction history associated with said digital asset in the respective partial distributed ledger of said first or second user's primary device are stored, wherein said third computer processor is further configured to create and update the central ledger with transaction-related-data and transaction history of digital assets registered under said device accounts for the first and second users of the system, and wherein the respective partial distributed ledger, located in at least one of the one or more computer-readable memories of the respective primary device of the first or second user, comprises at least transaction-related-data and transaction history of the digital asset, registered under the respective device account of the respective primary device of the respective user.

2. The system of claim 1, wherein the irreversible function is a hash function and the unique device identifiers comprise at least the International Mobile Equipment Identity (IMEI) and/or the Media Access Control (MAC) address of the first or second user's primary device.

3. The system of claim 1, wherein the first or second user's primary device is a smartphone, a computer tablet, electronic wearables or any other devices with networked capability frequently used by the respective user.

4. The system of claim 1, wherein the digital asset registered under the respective device account of the first or second user's primary device can only be redeemed, exchanged or traded using the respective application programming software installed in the respective user's primary device.

5. The system of claim 1, wherein HUDA representing a respective device account is not visible by any users of the system.

6. The system of claim 1 wherein the respective application programming software installed in the first or second user's primary device is configured to perform communication over application programing interface calls with the system using a device account name HUDA of said respective user's primary device for identification.

7. The system of claim 1, wherein said second computer processor is further configured to receive authentication data of said first or second user communicated from said respective application programming software from said respective primary device upon the first-time registration by said respective user with said respective primary device and to assign said respective user as an authorized user of said respective primary device.

8. The system of claim 7, wherein said authentication data comprises one or more of a password, a pattern code, answer to security question or other security verification data provided internally by the respective primary device or by third party applications.

9. The system of claim 1, wherein said central ledger created by said third computer processor is stored in said one or more computer-readable memories of said system, and the records comprise at least HUDA of each user's primary device, all transaction-related-data and transaction history to said digital asset registered under HUDA of the respective primary device.

10. The system of claim 1, wherein said partial ledger distributed by said third computer processor further comprises digital asset registered under said HUDA, and wherein the redemption/validation of said digital asset can only be done by the respective primary device with at least one of the password, pattern code or answer to security question pre-registered by the respective user of the respective primary device.

11. The system of claim 1, wherein said transaction-related-data comprises at least HUDA of said digital asset, available value and balance of said digital asset at each transaction, nature of the transaction, date and time of said transaction, and location data including global positioning system (GPS) data.

12. The system of claim 1, wherein said transaction history comprises at least a historical movement of Digital Asset being transferred from one device account to another device account in the course of purchase, receive, exchange, trade, redemption and validation of Digital Asset.

13. The system of claim 1, wherein said second computer processor sends and receives offer-to-barter-trade, offer-to-sell or/and offer-to-buy instructions from different primary devices of different authorized users in the course of barter trade, exchange/trade of said digital asset through said system.

14. The system of claim 1, wherein said exchange or trade of said digital asset in the course of exchange/trade from one user of one HUDA being a transferor to another user of another HUDA being a transferee comprises the actions taken by said third computer processor in deleting said digital asset from HUDA of the transferor and in recording said digital asset to HUDA of the transferee in the central ledger as well as in the partial distributed ledger of the transferor and in the partial distributed ledger of the transferee once the transfer of said digital asset is verified and approved by said second computer processor.

15. The system of claim 1, wherein said first or second user is able to access the digital asset registered in the respective user's primary device by using at least one pre-registered emergency device.

16. The system of claim 1, wherein said redemption of said digital asset issued by said selected vendor in the course of redemption from said first user of one HUDA at the point of redemption allowed by said selected vendor comprises action taken by said third computer processor in updating the balance value of said digital asset from HUDA of said first user in the central ledger of the system as well as in the partial distributed ledger of said first user's primary device once the redemption of said digital asset is verified and approved by said second computer processor and said first computer processor communicated with said selected vendor's system to receive the updated balance value of said digital asset.

* * * * *